United States Patent [19]
Day

[11] 3,783,195

[45] Jan. 1, 1974

[54] PLANT TELEPHONE COMMUNICATION SYSTEM

[76] Inventor: Paul B. Day, 1406 Holland Rd., Reading, Pa. 19607

[22] Filed: Dec. 22, 1971

[21] Appl. No.: 210,758

[52] U.S. Cl. .................................................. 179/28
[51] Int. Cl. ......................................... H04m 13/00
[58] Field of Search ................. 179/28, 37, 40, 1 H, 179/18 BF

[56] References Cited

UNITED STATES PATENTS

| | | | |
|---|---|---|---|
| 3,080,454 | 3/1963 | Wenrich et al. | 179/28 |
| 3,346,696 | 10/1967 | Mann | 179/1 H |
| 3,576,401 | 4/1971 | Saxon | 179/1 H |
| 3,542,968 | 1/1970 | Merser | 179/18 BF |

*Primary Examiner*—Ralph D. Blakeslee
*Attorney*—William J. Ruano

[57] ABSTRACT

This invention relates to a voice communication system for intra or interplant use and which operates with a constant D.C. line voltage with relatively lower currents to enable the lines to be much longer with less power loss. The line impedance may be of the order of 3,300 ohms. The system includes a complete handset amplifier and selector switch within the handset handle. A resistor in series with one of the lines provides energizing voltage to a silicon controlled rectifier which is also energized by an A.C. source to energize a relay or other controlled device. The system is basically a voltage system as compared to a regular telephone which is basically a current system.

19 Claims, 8 Drawing Figures

REGULATED ELECTRONIC CHOKES

MAIN POWER SUPPLY

INVENTOR
PAUL B. DAY
BY
William J. Ruano
his ATTORNEY

LINE MUTING CIRCUIT

REMOTE FUNCTION CONTROL

INVENTOR
PAUL B. DAY
BY
William J. Ruano
his ATTORNEY

HANDSET AMPLIFIER STATION DIAGRAM

INVENTOR
PAUL B. DAY
BY
William J. Ruano
his ATTORNEY

SPEAKER AMPLIFIER DIAGRAM

INVENTOR
PAUL B. DAY
BY
William J. Ruano
his ATTORNEY

HANDSET STATION DIAGRAM

INVENTOR
PAUL B. DAY
BY
William J Ruano
his ATTORNEY

PLANT TELEPHONE COMMUNICATION SYSTEM

This invention relates to a plant telephone communication system and is an improvement over Wenrich et al. U.S. Pat. No. 3,080,454, assigned to the present assignee.

An outstanding disadvantage of the telephone communication system described in the above said patent is that the very low impedance of the medium level line restricts this specific system to communication lines of short length, more specifically, to intra-plant systems as opposed to inter-plant systems. With such medium level line impedance of about 33 ohms, the signal currents involved will approximate 40 to 60 milliamperes. Long lines, therefore, result in signal attenuation.

A medium level line impedance in excess of the intended impedance (33 ohms) will result in an unbalance of hybrid circuit operation and an accompanying loss of anti-sidetone advantages, as described in the aforementioned patent. Considering the resistance involved in long lines, it is apparent that it is difficult to conveniently extend the practical use of the system described in said patent beyond any intra-plant usage.

Another disadvantage of the prior communications system referred to above, is that there is a multiplicity of equipment housed within the station enclosure which is necessary to accomplish the end result. Each handset has a power supply, complex selector switch, complex hookswitch, interconnecting harness and a costly 'plug-in' feature.

There are limitations in the abovementioned prior system due to the length of the handset cord. Since the input impedance to the handset amplifier is very low, the cord resistance, which may be several ohms on long cords, becomes a significant portion of the resistance in the microphone circuit. On long cords, this can and does cause attenuation of the signal.

Another disadvantage is the necessity of using a relay in the terminal box to select page or party line operation at a distance from the station. Otherwise it is necessary for the operator to return to the handset station selector switch each time he wishes to page.

Portable plug-in handset jack stations under the prior system are heavy, costly in themselves, and costly to field wire. It is also necessary to have 110 V.A.C. applied to the portable device to power it, a situation which is sometimes very undesirable.

An object of the present invention is to provide a novel communication system devoid of the abovementioned disadvantages and which is equally adaptable to intra-plant and inter-plant communication systems and is especially suitable for long time systems.

Another object of the present invention is to provide a novel communication system comprising relatively few and inexpensive parts so as to enable construction of a system at relatively low cost.

A more specific object of the invention is to provide a communication system having a considerably higher impedance line (about 3,300 ohms) then heretofore employed.

Another and more specific object of this invention is to locate the amplifier and page-party selector switch in the handset, rather than in the station enclosure as in the aforesaid patented system, thereby reducing the multiplicity of parts found in the enclosure of the station.

Still another specific object of the invention is to provide a very simple amplifier and to provide a system wherein harnessing is not found in the handset amplifier station, as it was found in the abovementioned patented system, therefore further reducing cost. The handset cord can be long since its resistance represents only a very small part of the total of the 3,300 ohms line.

Another object of the present invention, as compared to the aforesaid patented system which employs an ANOX device, is to provide a novel communication system which employs a device similar to an ANOX but with a switch triggered by direct current flow through the handset station line in use, rather than depending upon the background ambient noise level or an individual's voice originating at that handset. Since the handset station current is a very positive occurrence, the new switching device action is also a very positive action.

Still another object of the invention is to provide a very high resistance communication system of about 3,300 ohms to make it suitable for long lines, such as inter-plant lines, as compared to the aforesaid patented 33 ohm system which was designed basically for intra-plant operation. Operation beyond one mile presents line losses due to the resistance of the conductors involved in the cable. The resistance drop of a long line represents a great portion of the total resistance of a 33 ohm line. The same length of line having the same resistance would represent a lesser portion of the total resistance of a 3,300 ohm line. It follows, therefore, that the ultimate losses would be less with a higher impedance line than with the 33 ohms line. Thus, it is now possible, with the present system, to provide inter-plant operation. This can be done with fewer problems than before and also employing leased dry telephone lines.

In the patented system, referred to above, solid state switching is almost impossible. By using a high impedance line and a central D.C. Supply, as provided in the present invention, solid state switching is practical. The saturation resistance of solid state switches represents a minor part of the total 3,300 ohm line. Switching is done in 'slave' fashion. It becomes a simple thing since the line has direct current flowing through it and which is generally easier to switch as opposed to switching low voltage A.C. signals.

Another advantage of the present invention relates to the method of muting the speaker amplifier. The use of diode logic permits muting of one or more speaker amplifiers by one or more handset stations.

Other objects and advantages of the present invention will become more apparent from a study of the following description taken with the accompanying drawings wherein.

Figure 1:
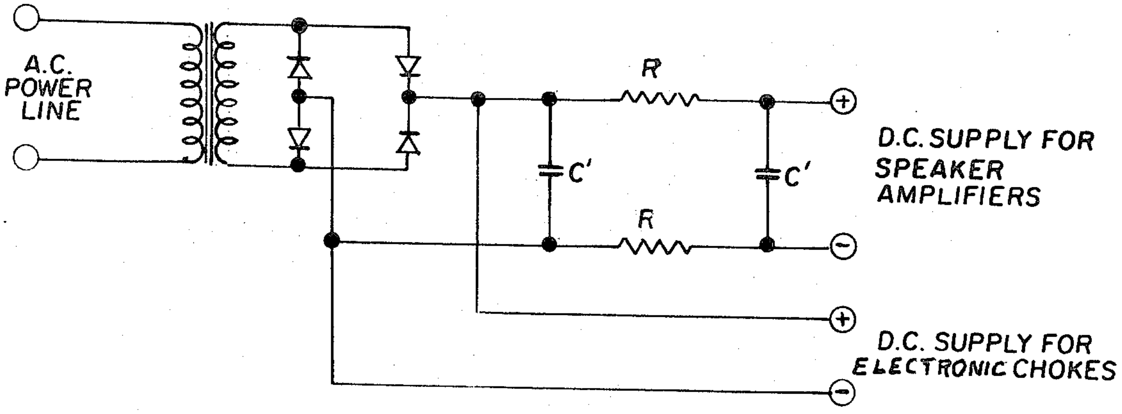
FIG. 1 is a circuit diagram of the main power supply.

Referring more particularly to FIG. 1 which shows a D.C. power supply, there is shown a conventional transformer coupled full wave bridge rectifier circuit using a capacitor input R,C′ filter employed to convert 60 cycle A.C. to a D.C. voltage suitable for use in the present system, for example 125 volts D.C.

Figure 2:
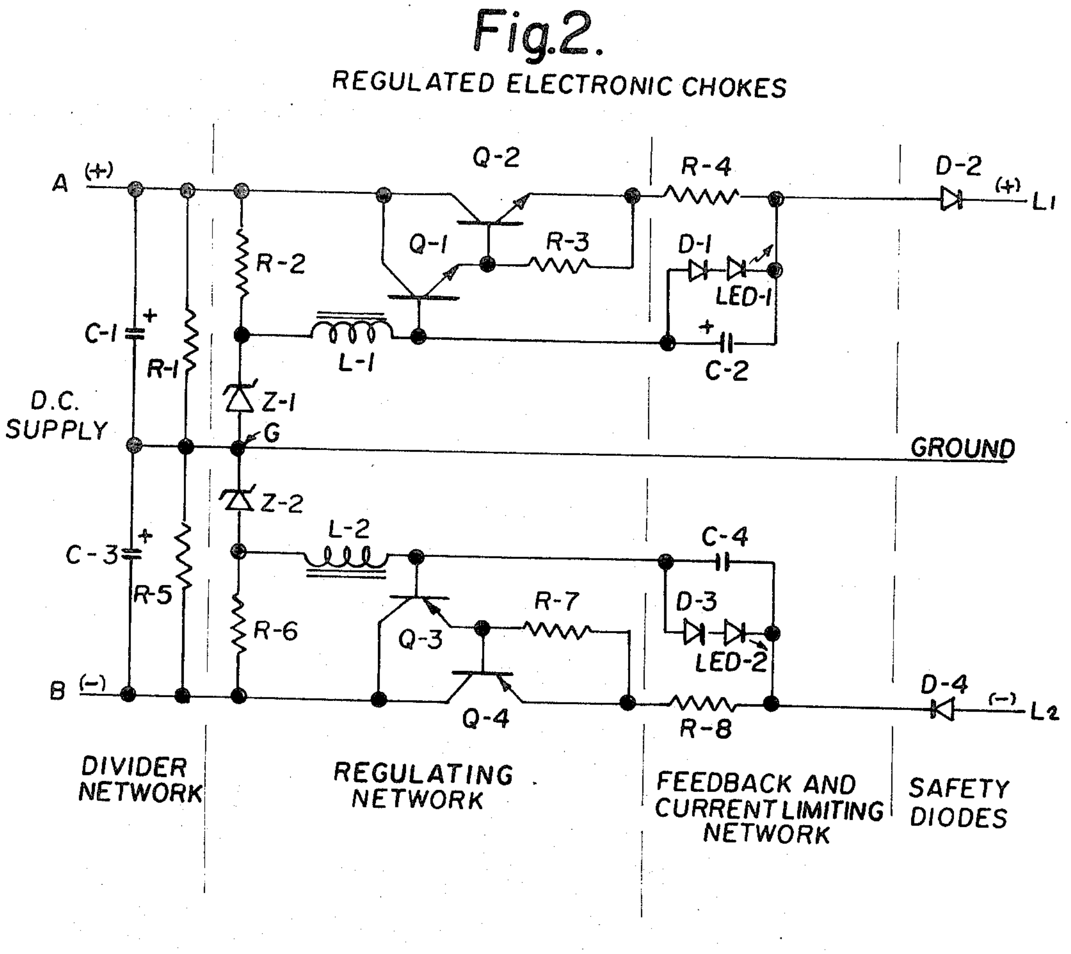
FIG. 2 is a circuit diagram of the regulated electronic chokes.

FIG. 2 shows a diagram of the regulated electronic chokes which supply power to one medium level line. One set of these electronic chokes is required for each medium level line. The device is designed to handle a quantity of handsets and therefore is capable of delivering current in an amount approximating one-fourth ampere at a line voltage of 48 volts D.C. The size, weight and wire resistance of two regular type iron core and copper wire chokes are factors which cause the electronic chokes to become very attractive in this application.

Power for this device is applied at points A and B, plus and minus respectively. Capacitors C–1 and C–2, resistors R–1 and R–5, resistors R–2 and R–6 and zener diodes Z–1 and Z–2 all form a voltage dividing network to achieve a center voltage point G which may be connected to a ground point. The primary function of R–1 and R–2 is to bleed the charge from C–1 and C–2 when the power is removed from the device. The primary function of Z–1 and Z–2 is to provide a well regulated voltage near to that required for the medium level line, that is about 48 volts D.C. The voltage applied to points A and B is about 125 volts D.C. and this voltage represents the peak value of signal swing that is available to the medium level line.

Consider first the section labeled Regulating Network and that portion in particular which is electrically more positive than ground point. G. Disregarding the effect of inductor L–1, those parts referred to, that is R–2, Z–1, Q–1, Q–2 and R–3, form a type of voltage regulating device. Voltage from the zener diode is applied to the base of Q–1 and in turn to the base of Q–2 by way of the emitter of Q–1. Likewise, the emitter of Q–2 delivers current to the medium level line and at a voltage value limited by Z–1.

The available current at this point of the explanation is limited only by current available through R–2, multiplied by the beta of Q–1 and again multiplied by the beta of Q–2. It is desirable to limit the current to a value adequate for system operation, in this case about one-fourth ampere. When current is drawn through $L_1$ a voltage drop appears across R–4 and therefore across D–1 and LED–1. This voltage increases in proportion with the amount of current being drawn. In the absence of these two diodes the full supply voltage would appear across R–4 resulting in very high current during a fault condition of $L_1$ shorted to ground G. However, when the voltage across these diodes reaches a value equal to the total forward voltage drop of both they will begin to conduct and any further increase in base current will be prevented since additional bias current through R–2 will be shunted to the load by these diodes. This will limit the line current to a value determined by the forward voltage drop of the diodes. Essentially no current flows through the diodes when the device is not overloaded. Since one of the diodes LED–1 is a light emitting diode, a short-to-ground or current-overload fault will be indicated when this diode conducts. It therefore has performed two functions in the way of helping to limit the line current and indicating by light when a certain fault occurs.

Transistors Q–1 and Q–2 are connected to form an emitter follower circuit which would be a very low source impedance to the medium level line except for the presence of the combination of resistor R–4, capacitor C–2 and inductance L–1 which together form a positive feedback network which cancels out the high negative feedback generally found in an emitter follower circuit. The purpose of inductance L–1 is to bias transistor Q–1 with D.C. current from resistor R–2 while at the same time allowing voice signals on the medium level line to be fed back to the base of transistor Q–1 so as to cancel out the inherent negative feedback of the circuit. The end result is a very high source impedance limited only by the inductance of L–1.

The circuitry shown in FIG. 2 and which is electrically more negative than point G constitutes the other electronic choke circuitry and, except for polarity, functions the same as the positive half of the device as described above.

Safety diodes D–2 and D–4 prevent any spurious voltage spikes on the medium level line from backing up into the device.

Figure 3:
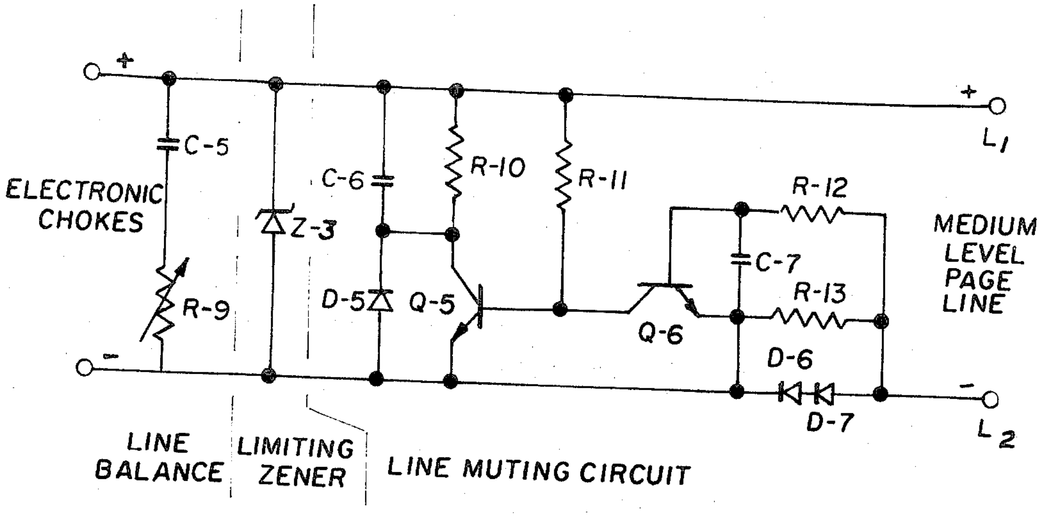
FIG. 3 is a circuit diagram of a spike suppressor.

FIG. 3 shows a Page line muting circuit and is not to be confused with a speaker muting circuit. A line balance control and a limiting zener diode are also shown. All three sections as shown are connected between the regulated electronic chokes and the medium level Page line. The line balance control and limiting zener diode are needed on all lines while the line muting circuit will generally be used only on the Page line to silence all the speakers when the line is not in use.

When current is being drawn through the medium level line there will be a voltage drop across resistor R–13 of sufficient value to turn on transistor Q–6 to saturation. This in turn causes transistor Q–5 to become turned off and allows capacitor C–6 to float freely and the line impedance to be of normal value, about 3,300 ohms. When the line is not in use and no current is being drawn there is no voltage drop across resistor R–13, transistor Q–6 turns off and transistor Q–5 turns on causing capacitor C–6 to be connected directly across the line thereby lowering the impedance to approximately zero. Diode D–5 is needed to prevent reverse biasing of transistor Q–5. Resistor R–10 is needed to bias the collector of transistor Q–5 and to discharge capacitor C–6 when the line is in use. Diodes D–6 and D–7 are used to limit the voltage drop across resistor R–13 in order to prevent damage to the base transistor Q–6 and to prevent excessive D.C. line losses across resistor R13 when a number of handsets are on the line at one time. Resistor R–12 and capacitor C–7 form a time delay circuit which causes transistors Q–6 and Q5 to switch slowly thereby preventing switching transients from being generated by transistors Q–5 and Q–6.

Control resistor R–9 is adjusted to obtain a line impedance of about 3,300 ohms with any fixed number of speaker amplifiers connected to the line. This number of speaker amplifiers varies with the size of the system and therefore resistor R–9 must be adjustable on the Page line only. On other lines the balance resistor may be a fixed value. Blocking capacitor C–5 prevents resistor R–9 from drawing line current.

Zener diode Z–3 clips off any excessively high voltage spikes that could appear if it were not there.

Figure 4:
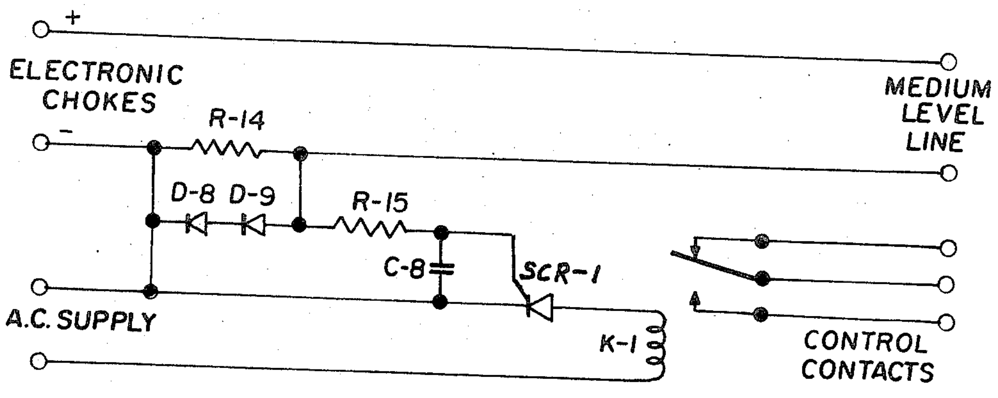
FIG. 4 is a circuit diagram of a remote function control.

FIG. 4 shows a remote function control illustrating one method of controlling a remote function from one or more handset stations. It is connected between the regulated electronic chokes and the medium level line. When a handset is removed from its hook, it will draw line current through resistor R–14 creating a D.C. voltage across resistor R–14 and, in turn, causing controlled rectifier SCR–1 to conduct for as long as the required voltage remains across resistor R–14. Diodes D–8 and D–9 limit the gate voltage to accommodate variations in line current. Capacitor C–8 is selected large enough to prevent spurious signals from turning on rectifier SCR–1. Resistor-15 limits the gate current to a safe value. A lamp or other device could replace or augment relay coil K–1 and a transistor could replace rectifier SCR–1 in a D.C. circuit.

Figure 5:
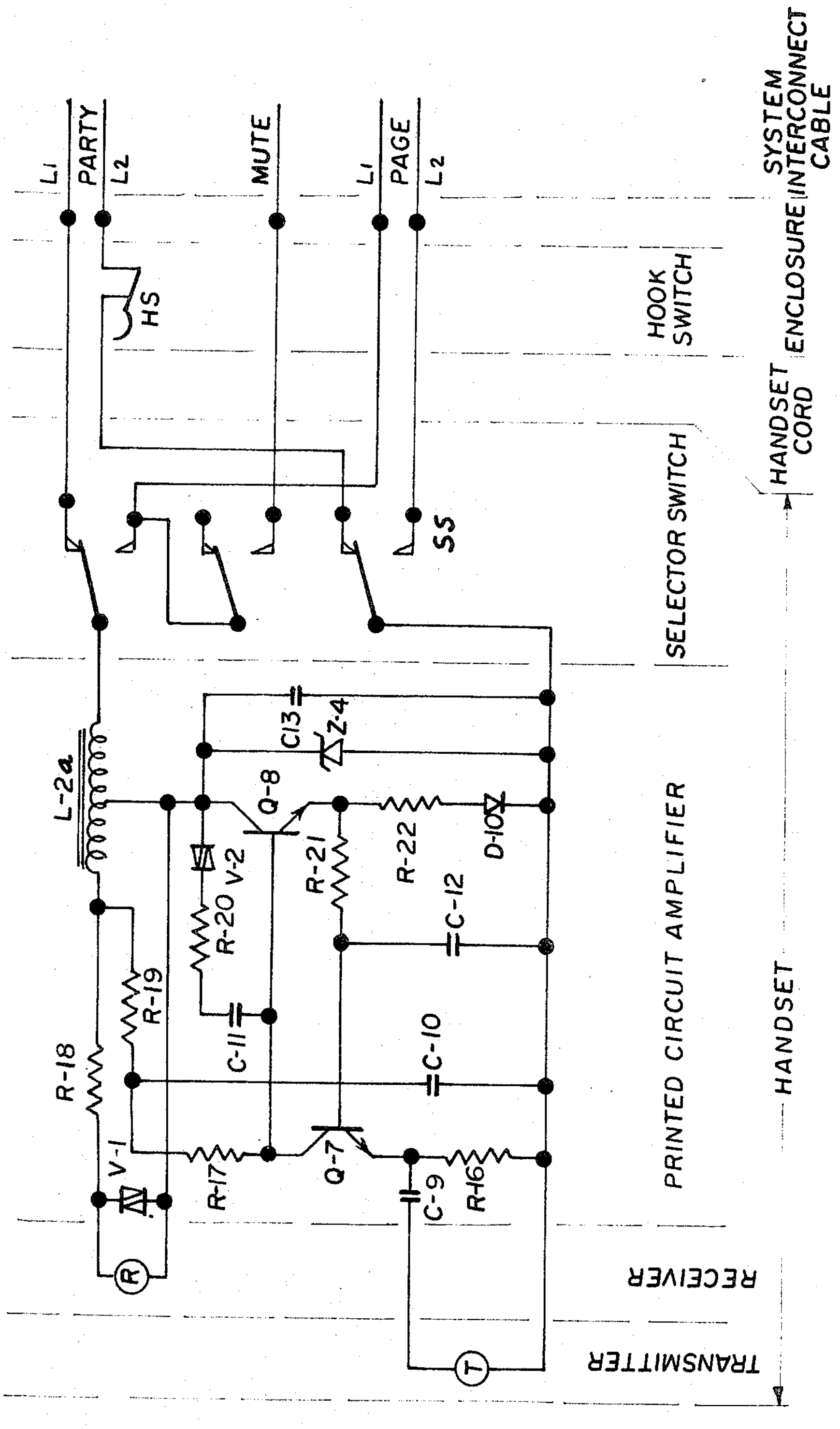
FIG. 5 is a handset-amplifier station circuit diagram.

FIG. 5 shows the basic circuitry for operation on one handset station and the handset, handset cord, switches, enclosure and system interconnecting cable are clearly shown.

Assume an operating condition so that current will flow in from line $L_1$ through switch SS and through one half of inductor L–2*a* and through transistor Q–8, resistor R–22, diode D–10 and thence out through switch SS and hookswitch HS to line $L_2$. Power for transistor Q–8 is derived in this manner. Resistor R–19 is a balance resistor and causes a balanced bridge effect when inductor L–2*a* is being driven by transistor Q–8. Signals appear both across line $L_1 - L_2$, and across resistor R–19. If the resistance of resistor R–19 is equal to the impedance of the line, then no signal will appear across the full inductor L–2*a* because of oppositely balanced currents. It, therefore, follows that when transmitting, no signals will be heard in the receiver element R. This constitutes an anti-sidetone network. The purpose of capacitor C–10 is to prevent resistor R–19 from draining current from the medium level line. Resistor R–19 also supplies current to the high gain pre-amplifier stage while capacitor C–10 also decouples that stage from the power output stage.

Operation of the amplifier is as follows:

Main current flow through the amplifier is through transistor Q–8, resistor R–22 and diode D–10. Transistor Q–8 receives its base drive from transistor Q–7 and from resistors R–17 and R–19. Transistor Q–7. operating in common base mode, is driven by dynamic microphone transmitter T through capacitor C–9, those signals appearing across emitter resistor R–16, thereby driving transistor Q–7. Current, voltage and heat stabilization is achieved through the feedback combination of resistors R–21 and R–22 and diode D–10. Current changes through transistor Q–8 are fed back through resistor R–21 to the base of transistor Q–7 which, in turn, automatically compensates and returns the current through transistor Q–8 to its normal value. Diode D–10 automatically adjusts the base bias voltage for transistor Q–7 when changes in ambient temperature occur. Capacitor C–12 reduces all signal feedback from transistor Q–8 through resistor R–21 to transsistor Q–7, thereby maintaining the necessary gain. Resistor R–18 limits the signal current through receiver R. When signal voltages appear across the line, signal currents will flow through inductor L–2*a*, through resistor R–19, through capacitor C–10 and back through the line. Signal currents also flow through receiver R and resistors R–19, allowing the operator to hear incoming signals. Varistor V–1 limits the earpiece level to a safe value for the human ear. The operator does not hear his own voice as previously explained. Capacitor C–13 prevents oscillation and eliminates radio frequency interference. Zener diode Z–4 prevents line transients from destroying elements of the amplifier.

An automatic level limiting circuit is employed to eliminate the need for a level control, by compensating for variations in components and voice levels. The circuit employs a varistor V–2 which is effectively out of the circuit until variations in collector voltage of transistor Q–8 become large enough to equal the conductive characteristics of the varistor. At this point the varistor passes the portion of the signal which exceeds the varistor breakdown voltage back to the base of transistor Q–8, out of phase with the drive signal, and in an amount limited by resistor R–20. The value of the varistor breakdown voltage is chosen to meet the requirements of the collector voltage swing with respect to the amount of limiting desired. Capacitor C–11 is needed to block D.C. differences between the collector and the base of transistor Q–8.

Figure 6:
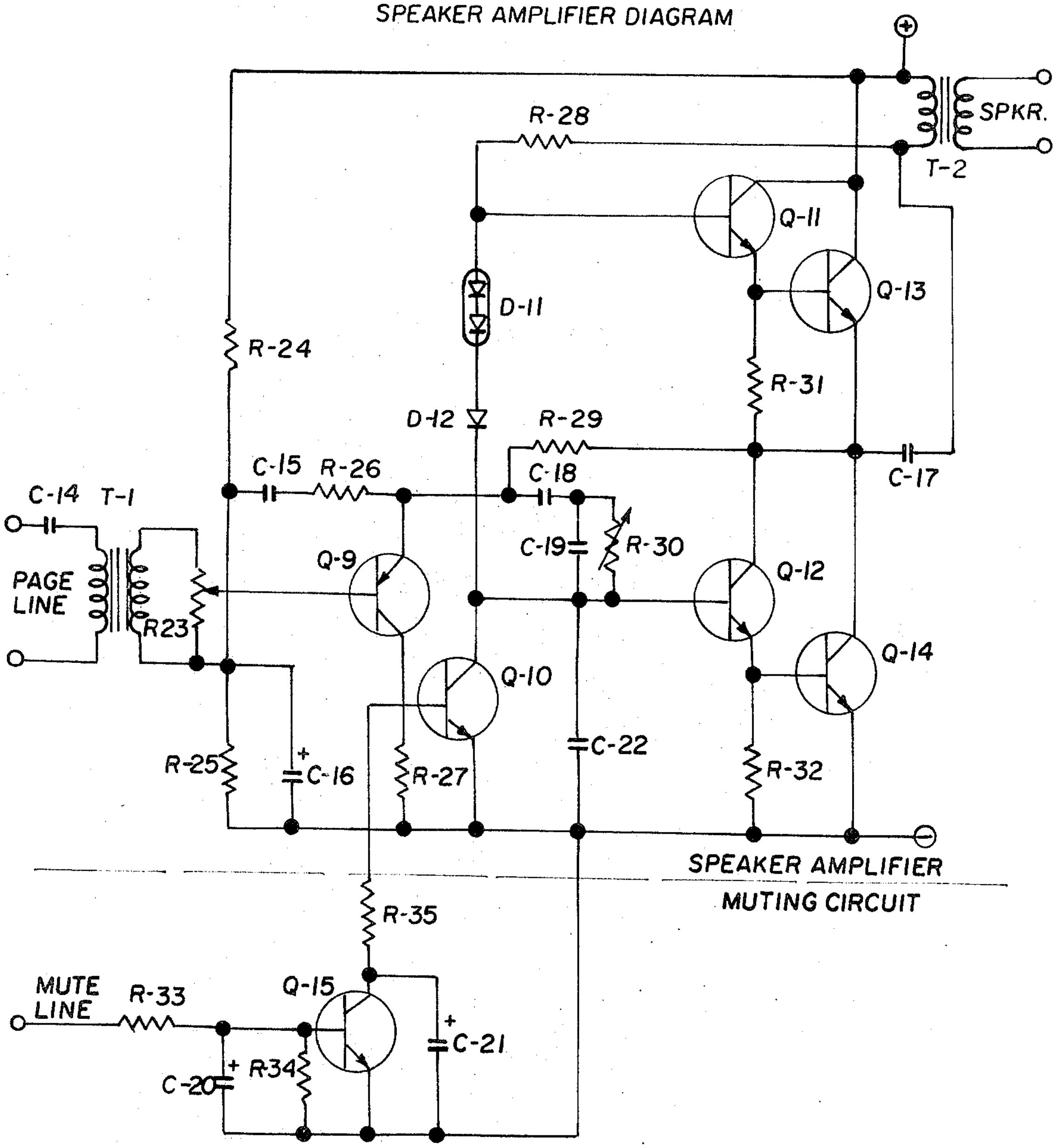
FIG. 6 is a speaker amplifier diagram.

FIG. 6 shows the speaker amplifier diagram. The speaker amplifier is of the quasi-complementary symmetry configuration using an isolation transformer T–1 between the Page line and the input to the amplifier and an isolation transformer T–2 between the speaker and the amplifier output. The remainder of the amplifier is direct coupled and is capable of operating from a supply voltage in excess of 125 volts D.C. so that it can be connected directly to a power generating station battery having that voltage.

Transformer T–2 matches the speaker impedance to the amplifier while T–1 is a bridging input transformer which matches the input of the amplifier to the line. Capacitor C–14 prevents direct current from flowing through the primary of transformer T–1.

Transistors Q–9 and Q–10 are primarily gain stages, transistors Q–13 and Q–14 are power output transistors while transistors Q–11 and Q–12 invert the phase and drive transistors Q–13 and Q–14 in class "B" fashion. Output coupling capacitor C–17 passes output power to speaker matching transformer T–2. Bias current for transistor Q–11 flows through the transformer primary which boot-straps the driver signal, reducing distortion.

A bridge type circuit is made up of resistors R–24 and R–25 on one side while the junction point of transistors Q–13 and Q–14 makes up the center point of the other side of the bridge. If this junction center point should try to move away from its design point of D.C. voltage, the current through transistor Q–9 will be altered, causing a shift in voltages and currents throughout the other stages of the amplifier until the junction point returns to its intended value. Capacitor C–15 and resistor R–26 permit a limited amount of signal degeneration to occur, resulting in low distortion and good frequency response. Resistors R–30 and capacitor C–18 form a tone control circuit. Diodes D–11 and D–12 are temperature control diodes which provide bias for class "B" operation of transistors Q–13 and Q–14.

A muting circuit is shown in FIG. 6 which is used to silence a loudspeaker adjacent to a handset station in use on the Page line in order to prevent acoustical feedback. When the handset involved is on the Page line it provides a positive voltage to a mute line which is applied to transistor Q–15 through resistor R–33. Transistor Q–15 is turned on and the bias voltage of Q–10 is reduced, disabling the amplifier and silencing the loudspeaker. Resistor R–33 and capacitor C–20 form a delay circuit to prevent transistor Q–15 from creating switching transients which might be heard from the loudspeaker. Resistor R35 and capacitor C–21 are used to decouple the muting circuit from the amplifier.

Figure 7:
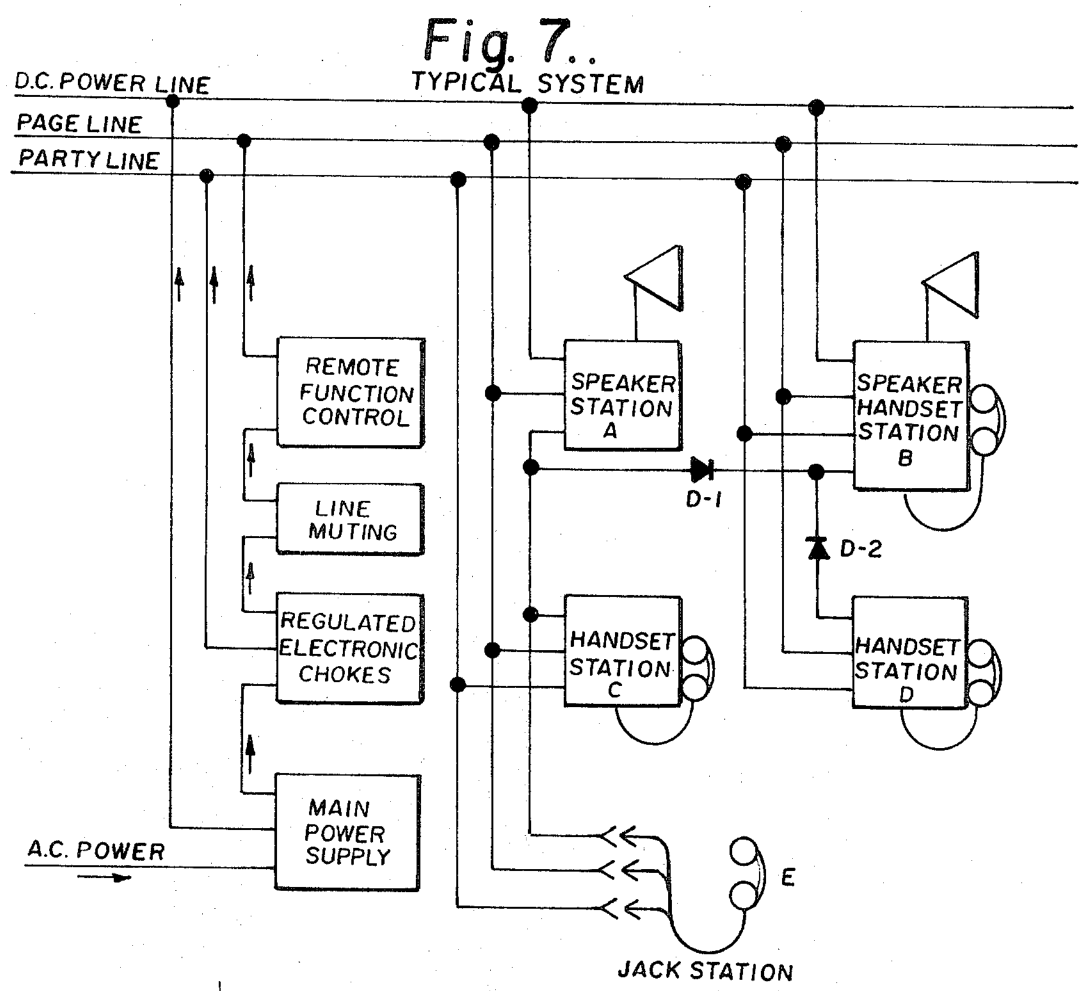
FIG. 7 is a schematic, block diagram of the entire communication system.

FIG. 7 shows a typical system wiring diagram. The main power supply provides D.C. power for the speaker amplifiers through the D.C. power line. The regulated electronic chokes are fed from this supply also. The chokes feed the Party line directly and the Page line is fed from the chokes through the line muting circuit and through the remote function control.

Several modes of speaker muting are shown using diode logic. Speaker Station A is muted by Handset Station C and also by Jack Station E. Speaker-Handset Station B is muted by all handsets shown. Handset Station C and Jack Station E mute Speaker Station A and Speaker-Handset Station B. Handset Station D mutes Speaker-Handset Station B only.

Figure 8:
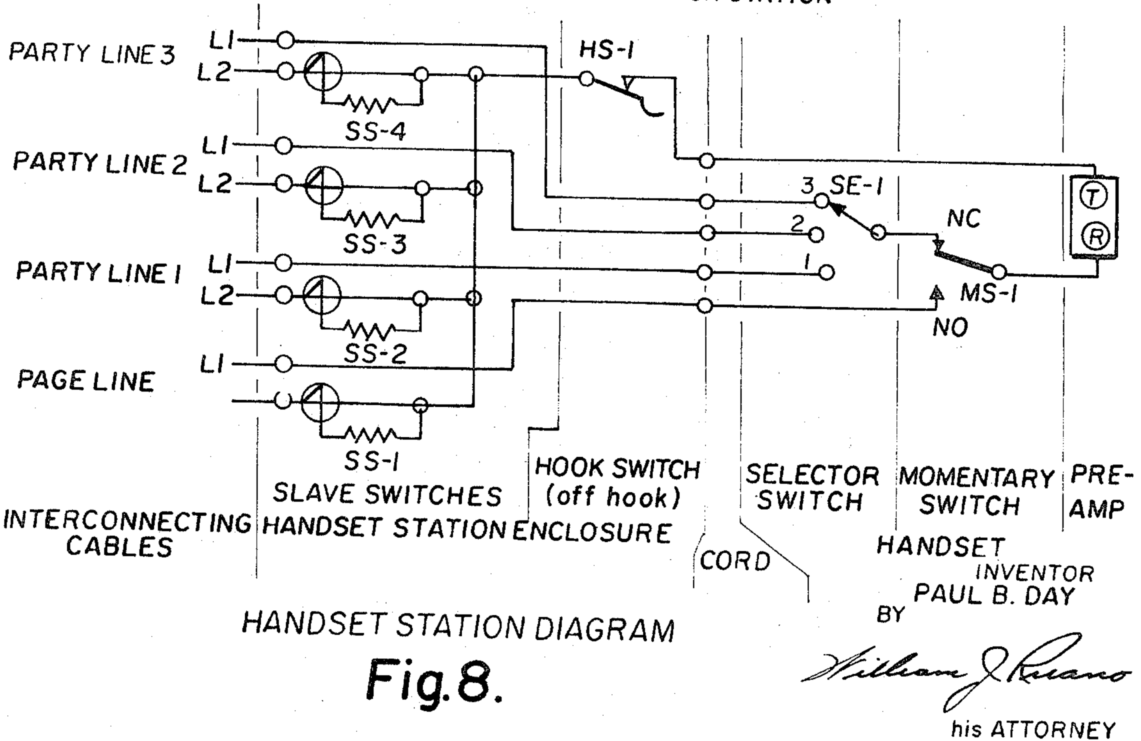
FIG. 8 is a modification of the line switching method and uses electronic switching in place of some mechanical switching.

FIG. 8 shows an alternate method of switching the handset amplifier from the Page line to the Party line using semiconductors instead of mechanical switches.

In the operation of the circuit condition shown in FIG. 8, current flows through line $L_1$ of Party line Circuit 3, through contact 3 of selector switch SE–1, through contact NC of momentary switch MS–1, through the pre-amplifier, from there through the closed hookswitch, assuming that the handset is off the hook, and current then flows through solid state switch SS–4 and back to the power supply through line $L_2$. Current will not flow through the other solid state switches because their associated circuits are not completed. Therefore, both sides of all other lines are open and no crosstalk will occur between lines. When momentary switch MS–1 is operated, the pre-amplifier is moved from party line circuitry to page circuitry and switch SS–4 then opens while switch SS–1 closes. The procedure for other party lines is similar. All circuits are open when the handset is returned to the hook and hookswitch HS–1 opens.

While FIG. 8 shows unilateral switches as the means of solid state switching, the same result can be achieved by using controlled rectifiers or transistors.

The PRE-AMP located within the handset is identical to the one shown in FIG. 5.

One outstanding advantage of the present invention not previously described is the portable plug-in handset jack station. Since everything of interest is in the handset, with the exception of the hookswitch, the handset/amplifier can be easily carried and conveniently plugged into any permanently located jack receptacle properly wired to the system. This allows the operator to enter hazardous areas during periods of shutdown. Examples of these locations would be the containment vessel of a nuclear power generating station and certain explosive areas of petroleum refining plants. The connections for a portable handset/amplifier station are shown in FIG. 7.

Thus it will be seen that I have provided a highly efficient communication system having the following highly advantageous features:

A voice communication system operating with constant D.C. line voltage and lower currents allowing the lines to be made longer with less signal loss (as compared with lower impedance lines); a voice communications line impedance higher than the present day telephone system; a voice communications line signal level higher than the present day telephone system and at least equal to the signal level of the prior intra-plant communications system, about 68 milliwatts; a system using a press-bar type handset for the purpose of changing from "party line" to the "page line"; a system using a complete handset station within the handle having all necessary amplification devices incorporated within the handle together with a selector switch so as to make it possible to switch between party lines and the page line without the necessity of walking back to the station or "hang-up" hook areas; a system using a handset with its corporate amplifier deriving its power from an external source and through its own handset cord; a centralized D.C. supply with power distributed on talking lines for simple adaptability to emergency power operations; simplified hazardous area stations; simplified jack stations with muting facilities; solid state line switching; simplified control and use of solid state switch for control of remote functions without the need of certain long control wiring; a communications system capable of operating on leased dry telephone lines; and a versatile and simple temporary system.

While I have illustrated and described several embodiments of my invention, it will be understood that these are by way of illustration only and that various changes and modifications may be contemplated in my invention and within the scope of the following claims.

I claim:

1. A voice communication voltage system comprising, a pair of line conductors energized by a constant voltage, direct current source; a plurality of telephone stations, each having high resistance of the order of thousands of ohms connected across said conductors, whereby voice signals impressed in said telephone stations will effect voltage modulations from zero to twice said D.C. voltage, a voltage divider network connected across said line conductors so as to provide a central group connection of zero volts, which is half way between the positive and negative terminals of said line conductors, a voltage regulating network having connected between said ground connection and one of said line conductors, a choke coil of high impedance and low D.C. resistance as well as means for limiting the current flow under short circuit conditions to a fraction of an ampere, whereby a voltage telephone system is provided wherein voice modulation will fluctuate from zero to about twice said D.C. line voltage.

2. A voice communication system as recited in claim 1, wherein each of said high A.C. impedance is a choke coil and with said telephone stations will provide an overall resistance of about 3,300 ohms.

3. A voice communication system as recited in claim 1, wherein said D.C. line voltage is about 125 volts and wherein the voltage across said telephone stations is of the order of 48 volts D.C., whereby modulations from voice signals will vary from zero to twice said 48 volts, namely, to about 96 volts.

4. A voice communication system as recited in claim 1, wherein said line voltage is of the order of 125 volts D.C. and wherein the voltage applied across each telephone station if of the order of 48 volts D.C. and wherein the D.C. resistance across each telephone station is of the order of 3,300 ohms.

5. A voice communication system as recited in claim 1, wherein said means for limiting the current flow comprises a zener diode connected between said ground connection and one terminal of said choke coil and includes a pair of transistors connected between the other choke coil terminal and a line conductor, forming an emitter follower circuit, and wherein the associated choke coil biases one of said transistors with D.C. current from a resistance connected across said one terminal of said choke coil and said line conductor while at the same time allowing voice signals on the line to be fed back to the base of said transistor so as to cancel out the inherent negative feedback of the circuit, with the end result of providing a very high source impedance limited only by the inductance of said associated choke coil.

6. A voice communication system as recited in claim 5, together with a safety diode in each of said line conductors to prevent any spurious spikes on the line from backing up into a telephone station.

7. A voice communication voltage system comprising a power line energized by constant voltage, direct current of the order of 125 volts and having a line impedance of the order of thousands of ohms, a page line and a party line, a plurality of separate stations interconnected by said power, page and party lines, each station including a loudspeaker having an amplifier connected to said page line and a handset including a handset preamplifier which is energized by the constant voltage, direct current, each handset including a selector switch for selectively connecting the handset to either said page line or to one of a plurality of party lines, each party line and page line including a solid state slave switch associated with said handset.

8. A system as recited in claim 7 wherein said preamplifier is connected in series with a hookswitch and said selector switch, said preamplifier contained within said handset, said slave switches being selectively connected in series with said hookswitch and selector switch so that current will flow through only one slave switch at one time and thereby avoid cross talk because of uncompleted circuits through the other slave switches.

9. A system as recited in claim 8 wherein said hookswitch, selector switch and preamplifier are enclosed within the handle portion of said handset.

10. A system as recited in claim 8, together with a momentary switch in series with said selector switch and preamplifier and wherein said slave switches are silicon unilateral switches.

11. A voice communication system as recited in claim 7, comprising a resistor in series with one of the lines of said system energized by the constant D.C. line voltage, a silicon controlled rectifier in series circuit relationship with said resistor, and a controlled relay in series with and controlled by said rectifier and energized by a separate A.C. power source.

12. A voice communication system as recited in claim 7, wherein said constant D.C. line voltage is applied to a voltage dividing and electronic choke network to provide a center voltage point which is grounded midpoint said D.C. plus and negative supply lines, a pair of capacitors, each connected between said center voltage point and one of the D.C. supply lines, a resistor bridging each capacitor to bleed the charge of the bridged capacitor when power is removed, and a zener diode, inductor and diode means serially bridging a second resistor connected to a power line in series with said zener diode for regulating the voltage of said D.C. supply line and for limiting line current.

13. A system as recited in claim 12 together with a transistor emitter follower circuit connected between the terminal of each inductor closest said zener diode and one of said D.C. lines and in series with a line resistor bridged by said diode means and by a capacitor.

14. A system as recited in claim 12, wherein said diode means includes a light emitting diode which, when conducting, will indicate a short-to ground or current overload fault.

15. A system as recited in claim 14, including a safety diode in series with each of said D.C. supply lines for preventing spurious voltage spikes from backing up into the system.

16. A system as recited in claim 7, wherein a Page line muting circuit is connected across said Page line to silence all said loudspeakers when said handsets are not in use.

17. A system as recited in claim 7, said muting circuit comprising a resistor and capacitor connected across said Page line, a second capacitor selectively connectable across said Page line, a Page line resistor and transistor means connected therewith so that when line current flows through said Page line resistor, the line impedance will be of the order of 3,300 ohms, and when no current is flowing through said Page line and Page line resistor, said last mentioned capacitor will be connected driectly across the line by said transistor means to lower the line impedance to approximately zero.

18. A system as recited in claim 17, together with diode means connected across said Page line resistor to limit the voltage drop thereacross and prevent excessive line losses across said Page line resistor when a number of handsets are on the line at one time.

19. A system as recited in claim 18 together with a Zener diode connected across said first mentioned resistor and capacitor for clipping off excessively high voltage spikes.

* * * * *